United States Patent [19]
Lyons et al.

[11] Patent Number: 5,107,195
[45] Date of Patent: Apr. 21, 1992

[54] ROTOR POSITION ESTIMATOR FOR A SWITCHED RELUCTANCE MACHINE USING A LUMPED PARAMETER FLUX/CURRENT MODEL

[75] Inventors: James P. Lyons, Niskayuna; Stephen R. MacMinn, Schenectady; Mark A. Preston, Niskayuna, all of N.Y.

[73] Assignee: General Electric Company, Schenectady, N.Y.

[21] Appl. No.: 653,371

[22] Filed: Feb. 11, 1991

[51] Int. Cl.$^5$ .............................................. H02F 8/00
[52] U.S. Cl. .................... 318/701; 318/254; 318/721
[58] Field of Search ............... 318/701, 138, 696, 254, 318/721, 807, 809

[56] References Cited

U.S. PATENT DOCUMENTS

| | | | |
|---|---|---|---|
| 4,584,506 | 4/1986 | Kaszmann | 318/701 |
| 4,739,240 | 4/1988 | MacMinn et al. | 318/696 |
| 4,772,839 | 9/1988 | MacMinn et al. | 318/696 |
| 4,896,089 | 1/1990 | Kliman et al. | 318/701 |
| 4,933,620 | 6/1990 | MacMinn et al. | 318/701 |
| 4,959,596 | 9/1990 | MacMinn et al. | 318/254 |
| 4,961,038 | 10/1990 | MacMinn et al. | 318/696 |
| 4,990,843 | 2/1991 | Moren et al. | 318/701 |

*Primary Examiner*—William M. Shoop, Jr.
*Assistant Examiner*—John W. Cabeca
*Attorney, Agent, or Firm*—Jill M. Breedlove; James C. Davis, Jr.; Marvin Snyder

[57] ABSTRACT

A method and apparatus for indirectly determining rotor position in a switched reluctance motor (SRM) are based on a flux/current model of the machine, which model includes multi-phase saturation, leakage, and mutual coupling effects. The flux/current model includes a network mesh of stator, rotor and air gap reluctance terms. The network is driven by magnetomotive force (mmf) terms corresponding to the ampereturns applied to each of the stator poles. Phase current and flux sensing for each phase are performed simultaneously. The reluctance terms of the flux/current model are determined from the phase flux and current measurements. The phase current and flux measurements also determine the rotor position angle relative to alignment for each respective motor phase and which phase (or phases) is operating in its predetermined optimal sensing region defined over a range of rotor angles. The measurements on at least two phases are then used for establishing whether the stator phases of the sensing phase are approaching alignment or maximum unalignment with SRM rotor poles. Finally, the rotor position angle for the sensing phase and its position relative to alignment are used to provide a rotor position estimate for the motor.

8 Claims, 10 Drawing Sheets

ROTOR POSITION ESTIMATOR FOR A SWITCHED RELUCTANCE MACHINE USING A LUMPED PARAMETER FLUX/CURRENT MODEL

RELATED PATENT APPLICATIONS

This patent application is related to commonly assigned U.S. patent application of J. P. Lyons and S. R. MacMinn entitled "Rotor Position Estimator for a Switched Reluctance Machine", Ser. No. 07/653,374 filed concurrently herewith and incorporated by reference herein.

FIELD OF THE INVENTION

The present invention relates generally to switched reluctance machines and, more particularly, to a rotor position estimator employing a lumped parameter flux/current model of a switched reluctance machine.

BACKGROUND OF THE INVENTION

A switched reluctance machine (SRM) is a brushless, synchronous machine having salient rotor and stator poles. There is a concentrated winding on each of the stator poles, but no windings or permanent magnets on the rotor. Each pair of diametrically opposite stator pole windings is connected in series or in parallel to form an independent machine phase winding of the multiphase SRM. Ideally, the flux entering the rotor from one stator pole balances the flux leaving the rotor from the diametrically opposite stator pole, so that there is no mutual magnetic coupling among the phases.

Torque is produced by switching current in each phase winding in a predetermined sequence that is synchronized with angular position of the rotor. In this way, a magnetic force of attraction results between the rotor poles and stator poles that are approaching each other. The current is switched off in each phase before the rotor poles nearest the stator poles of that phase rotate past the aligned position; otherwise, the magnetic force of attraction would produce a negative or braking torque. Hence, by properly positioning the firing pulses relative to rotor angle, forward or reverse operation and motoring or generating operation can be obtained. Typically, the desired phase current commutation is achieved by feeding back the rotor position signal to a controller from a shaft angle transducer, e.g. an encoder or a resolver. To improve reliability and to reduce size, weight, inertia, and cost in such drives, it is desirable to eliminate this shaft position sensor. To this end, various approaches have been previously proposed for indirect rotor position sensing by monitoring terminal voltages and currents of the motor. One such approach, referred to as waveform detection, depends upon back electromotive forces (emf) and is, therefore, unreliable at low speeds and inoperative at zero speed.

Another approach to indirect rotor position sensing is disclosed in commonly assigned U.S. Pat. No. 4,772,839, issued Sep. 20, 1988 to S. R. MacMinn and P. B. Roemer, which patent is incorporated by reference herein. The cited patent describes an indirect position estimator for a SRM which applies low-level sensing pulses of short duration to the unenergized motor phases. Application of the sensing pulses results in a change in current in each of the unenergized phases. The change in current is sensed by a current sensor and an estimated inductance value is derived therefrom. A pair of estimated rotor angles corresponding to the estimated inductance value for each of the unenergized phases is ascertained. One such pair is shifted by a value equal to a known phase displacement of the other unenergized phase. The pairs of estimated angles are then compared to determine which of the angles match. An estimated instantaneous rotor angular position equal to the matching angle is produced. Moreover, in case any of the stator phases undergoes a change in state during sampling or in case two phases do not remain energized throughout the sampling, an extrapolator is provided to generate an extrapolated rotor angular position instead of the estimated position.

Still another approach to indirect rotor position sensing is disclosed in commonly assigned U.S. Pat. No. 4,959,596, issued to S. R. MacMinn, C. M. Stephens and P. M. Szczesny on Sep. 25, 1990, which patent is incorporated by reference herein. According to U.S. Pat. No. 4,959,596, a method of indirect rotor position sensing involves applying voltage sensing pulses to one unenergized phase. The result is a change in phase current which is proportional to the instantaneous value of the phase inductance. Proper commutation time is determined by comparing the change in phase current to a threshold current, thereby synchronizing phase excitation to rotor position. Phase excitation can be advanced or retarded by decreasing or increasing the threshold, respectively.

Although the patents hereinabove cited advantageously provide methods for indirectly determining rotor position so that a conventional rotor position sensor is not required, it may be desirable in some applications to avoid active probing of the motor phases, i.e. by applying sensing pulses thereto, since such probing generally results in speed limitations. One such method of indirect rotor position sensing is described in U.S. patent application of J. P. Lyons and S. R. MacMinn, Ser. No. 07/653,374, cited hereinabove. The method of the Lyons and MacMinn patent application, Ser. No. 07/653,374 is based on instantaneous phase flux and phase current measurements. In particular, phase current and flux sensing are performed in a predetermined sequence that depends on the particular quadrant of operation, i.e. forward motoring, reverse motoring, forward generating, or reverse generating. For each phase in the predetermined sequence of sensing, phase flux and phase current measurements are made during operation in a pair of predetermined sensing regions, each defined over a range of rotor angles. Rotor angle estimates are derived from the phase flux and phase current measurements for each respective phase during the respective sensing regions thereof. The rotor angle estimates for each phase are normalized with respect to a common reference phase, and a rotor position estimate for the SRM is computed therefrom.

Although the method of the Lyons and MacMinn application, Ser. No. 07/653,374, is useful for determining rotor position without active probing of the motor phases, it may not be suitable for all SRM applications, because that method assumes that current is flowing in only one SRM phase at a time and thus does not take into account multi-phase saturation, leakage, and mutual coupling effects. Therefore, another rotor estimation method which does take into account the aforementioned multi-phase effects is desirable for applications wherein current may be flowing in more than one phase at any instant.

OBJECTS OF THE INVENTION

Accordingly, an object of the present invention is to provide a new and improved method and apparatus for indirectly sensing rotor position in a SRM.

Another object of the present invention is to provide a method for indirectly determining rotor position in a SRM which does not require active probing of the motor phase windings, but which is efficiently and accurately employed to determine rotor position from measured phase terminal quantities in conjunction with a lumped parameter, flux/current model of the machine.

Still another object of the present invention is to provide a method for indirectly determining rotor position in a SRM from measured phase terminal quantities in conjunction with a lumped parameter, flux/current model of the machine, which model includes multi-phase saturation, leakage, and mutual coupling effects.

Yet another object of the present invention is to provide a rotor position estimator for a SRM which indirectly determines rotor position from measured phase terminal quantities in conjunction with a lumped parameter, flux/current model of the machine, which model includes multi-phase saturation, leakage, and mutual coupling effects.

SUMMARY OF THE INVENTION

The foregoing and other objects of the present invention are achieved in a method and apparatus for indirectly determining rotor position in a SRM using a flux/current model of the machine, which model includes multi-phase saturation, leakage, and mutual coupling effects. In particular, the flux/current model includes a network mesh of stator, rotor and air gap reluctance terms. The network is driven by magnetomotive force (mmf) terms corresponding to the ampere-turns applied to each of the stator poles. The stator pole flux terms resulting from this excitation are determined by sensing phase current and phase flux in the machine. In accordance with this method, phase current and flux sensing for each phase are performed simultaneously. From these phase current and flux measurements, the reluctance terms of the flux/current model are determined, from which the rotor position angle relative to alignment is determined for each respective motor phase. Furthermore, from these phase current and flux measurements, it is determined which phase (or phases) is operating in its predetermined optimum sensing region defined over a range of rotor angles, hereinafter designated as the sensing phase. The measurements on the remaining phases are then used for establishing whether the stator phases of the sensing phase are approaching alignment or maximum unalignment with SRM rotor poles. Finally, the rotor position angle for the sensing phase is used to provide a rotor position estimate for the motor.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1A:
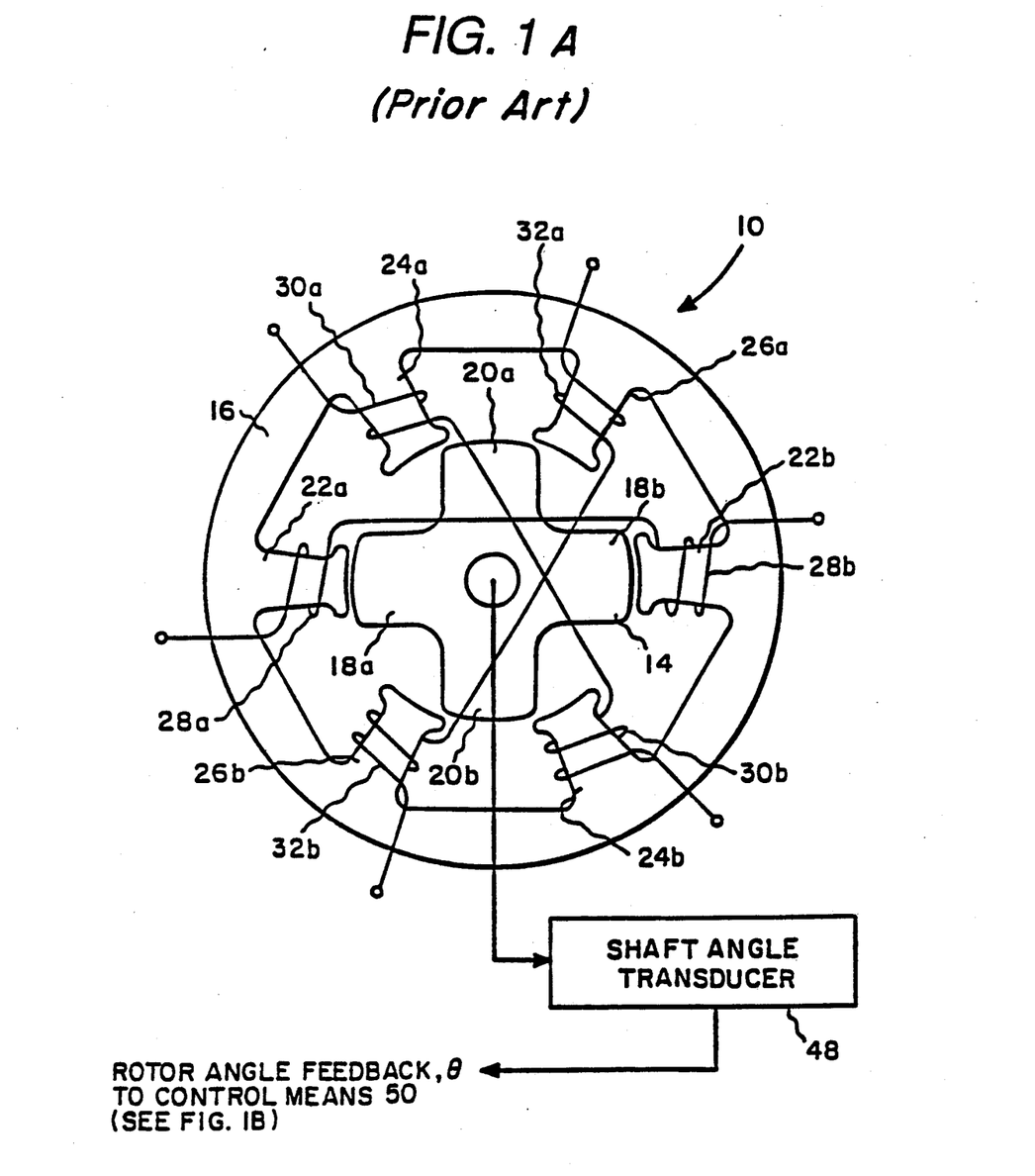
FIG. 1 is a schematic illustration of a conventional SRM drive.
Figure 1B:
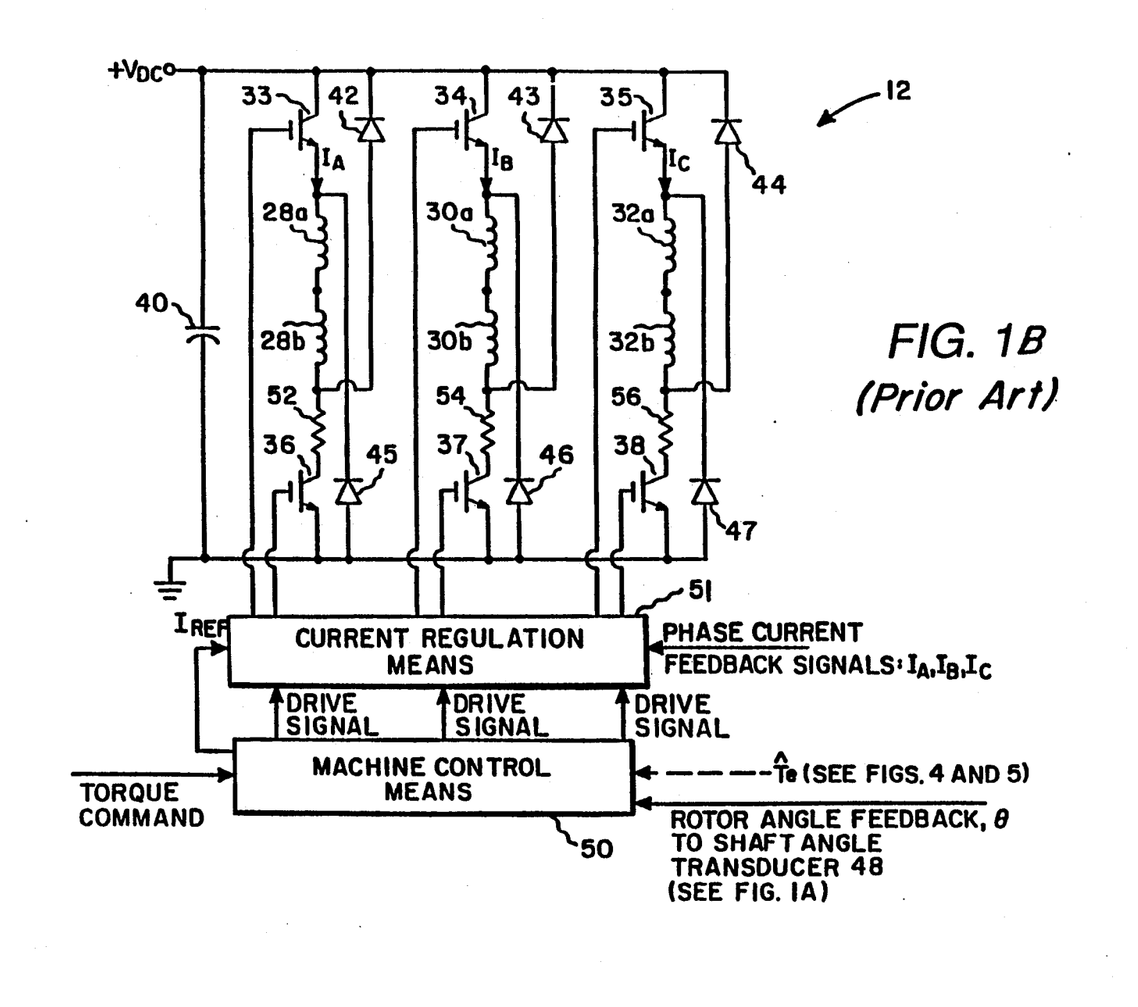

FIG. 1 shows a conventional SRM drive configuration. By way of example, SRM 10 is illustrated as a three-phase machine with its associated power inverter 12. As shown, SRM 10 includes a rotor 14 rotatable in either a forward or reverse direction within a stationary stator 16. Rotor 14 has two pairs of diametrically opposite rotor poles 18a-18b and 20a-20b. Stator 16 has three pairs of diametrically opposite stator poles 22a-22b, 24a-24b and 26a-26b. Stator pole windings 28a-28b, 30a-30b and 32a-32b, respectively, are wound on stator pole pairs 22a-22b, 24a-24b and 26a-26b, respectively. Conventionally, the stator pole windings on each pair of opposing or companion stator pole pairs are connected in series or parallel to form a machine phase winding. As illustrated in FIG. 1, the stator pole windings comprising each companion pair 28a-28b, 30a-30b and 32a-32b, respectively, are connected in series with each other and with an upper current switching device 33, 34 and 35, respectively, and with a lower current switching device 36, 37 and 38, respectively. The upper and lower switching devices are each illustrated as comprising an insulated gate bipolar transistor (IGT), but other suitable current switching devices may be used; for example, field effect transistors (FET's), gate turn-off thyristors (GTO's), or bipolar junction transistors (BJT's). Each phase winding is further coupled to a dc source, such as a battery or a rectified ac source, by flyback or return diodes 45 and 42, 46 and 43, and 47 and 44, respectively. At the end of each conduction interval of each phase, stored magnetic energy in the respective phase winding is returned, through the respective pair of these diodes connected thereto, to the dc source. Each series combination of the phase winding with two corresponding switching devices and two flyback diodes comprises one phase leg of inverter 12. The inverter phase legs are connected in parallel to each other and are driven by the dc source, which impresses a dc voltage $V_{dc}$ across the parallel inverter phase legs. Capacitance 40 is provided for filtering transient voltages from the dc source and for supplying ripple current to the inverter.

Typically, as shown in FIG. 1, a shaft angle transducer 48, e.g. an encoder or a resolver, is coupled to rotor 14 for providing rotor angle feedback signals to machine control means 50. An operator command, such as a torque command, is also generally supplied as an input signal to control means 50. Phase current feedback signals are supplied to a current regulation means 51 which receives phase current feedback signals $I_A$, $I_B$ and $I_C$ from current sensors 52, 54 and 56. Suitable current sensors are well-known in the art and may comprise, for example, Hall-effect sensors, sensing transformers, sensing transistors, or sensing resistors. Control means 50 further provides a commanded reference current waveform $I_{REF}$ to current regulation means 51, as described in commonly assigned U.S. Pat. No. 4,961,038, issued to S. R. MacMinn on Oct. 2, 1990, which patent is incorporated by reference herein. In well-known fashion, such as described in commonly assigned U.S. Pat. No. 4,739,240, issued to S. R. MacMinn and P. M. Szczesny on Apr. 19, 1988, which patent is also incorporated by reference herein, the control means provides firing signals to inverter 12 for energizing the machine phase windings in a predetermined sequence, depending upon the particular quadrant of operation.

Saliency of both the rotor and stator of a SRM causes the machine to have an air gap of varying length. As a result, phase inductance as viewed from the stator phase windings is a strong function of rotor position. Specifically, phase inductance ranges from a maximum value $L_a$, corresponding to alignment of rotor poles with the stator poles of the respective phase, to a minimum value $L_u$, corresponding to maximum unalignment of rotor poles with the stator poles of the respective phase.

The current I in one phase winding of a SRM and the flux $\Psi$ linked by that winding are related by the winding inductance L according to the following expression:

$$\Psi = LI \quad (1)$$

Figure 2:
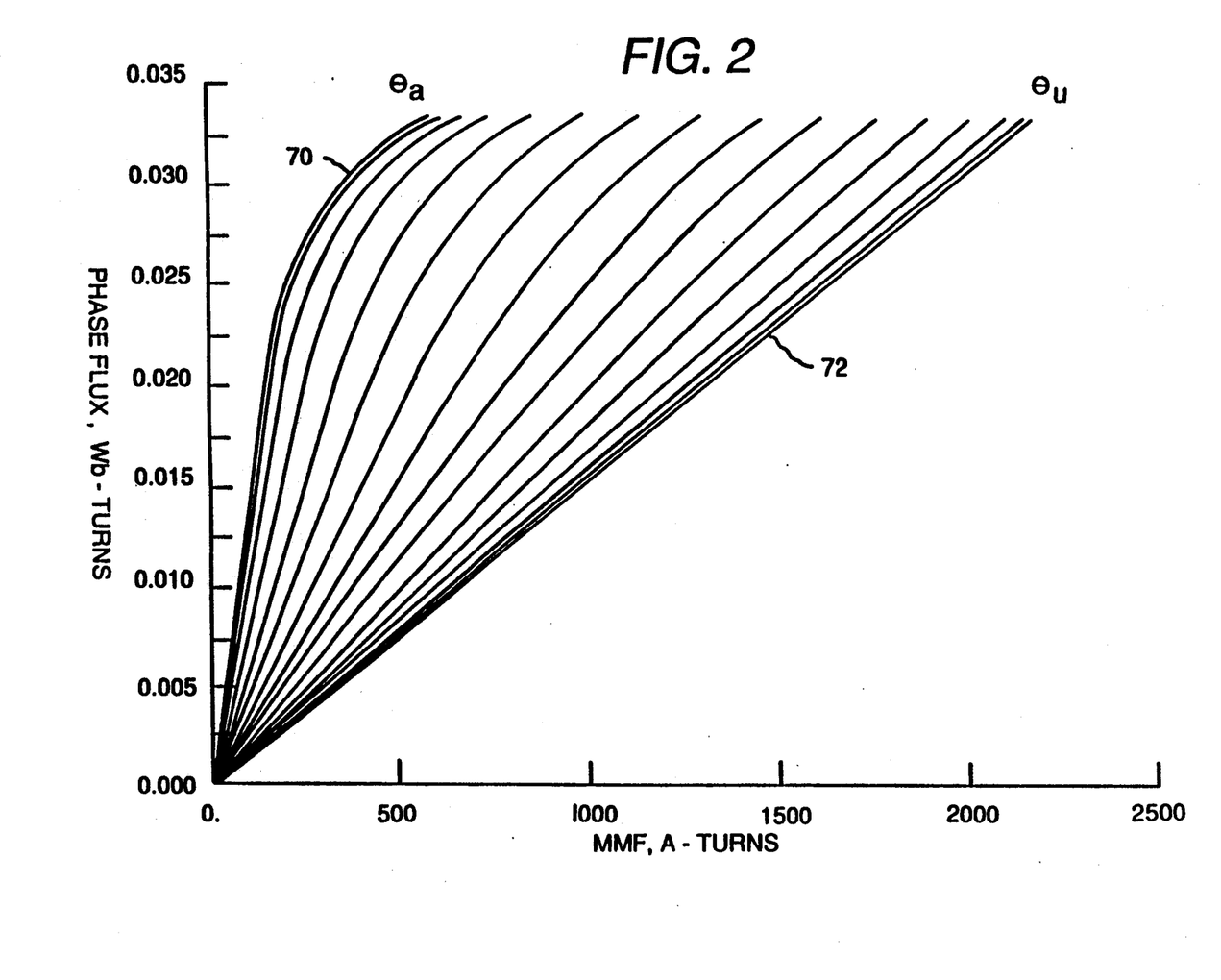
FIG. 2 is a graphical illustration of phase flux versus phase current for different values of rotor angle.

Thus, if phase flux linkage $\Psi$ is plotted against phase current I, the slope of the resulting graph is the phase inductance. FIG. 2 graphically illustrates phase flux $\Psi$ versus magnetomotive force (mmf, in ampere-turns) for different values of rotor angle $\theta$, in electrical degrees. (As will be appreciated by those skilled in the art, in a SRM having a three-phase, 6-4 pole configuration, such as that illustrated in FIG. 1, a mechanical degree is one-fourth of an electrical degree. However, since electronic commutation is the concern herein, all positions will be described in terms of electrical degrees.) In FIG. 2, the bending of the curves at the higher values of flux $\Psi$ is caused by magnetic saturation of the iron in the motor. Curve 70, which has the steepest initial slope, represents the $\Psi$-I curve for the excited phase when the stator poles of that phase are aligned with rotor poles, the rotor angle corresponding thereto being designated as $\theta_a$. On the other hand, curve 72, which has the smallest initial slope, represents the $\Psi$-I curve for the excited phase when the stator poles of that phase are at the point of maximum unalignment with rotor poles of the SRM, the rotor angle corresponding thereto being designated as $\theta_u$. The curves falling between curves 70 and 72 represent intermediate inductance values corresponding to varying degrees of rotor and stator pole overlap, with the slopes of the curves monotonically decreasing as the rotor advances from the aligned position to the unaligned position.

Figure 3:
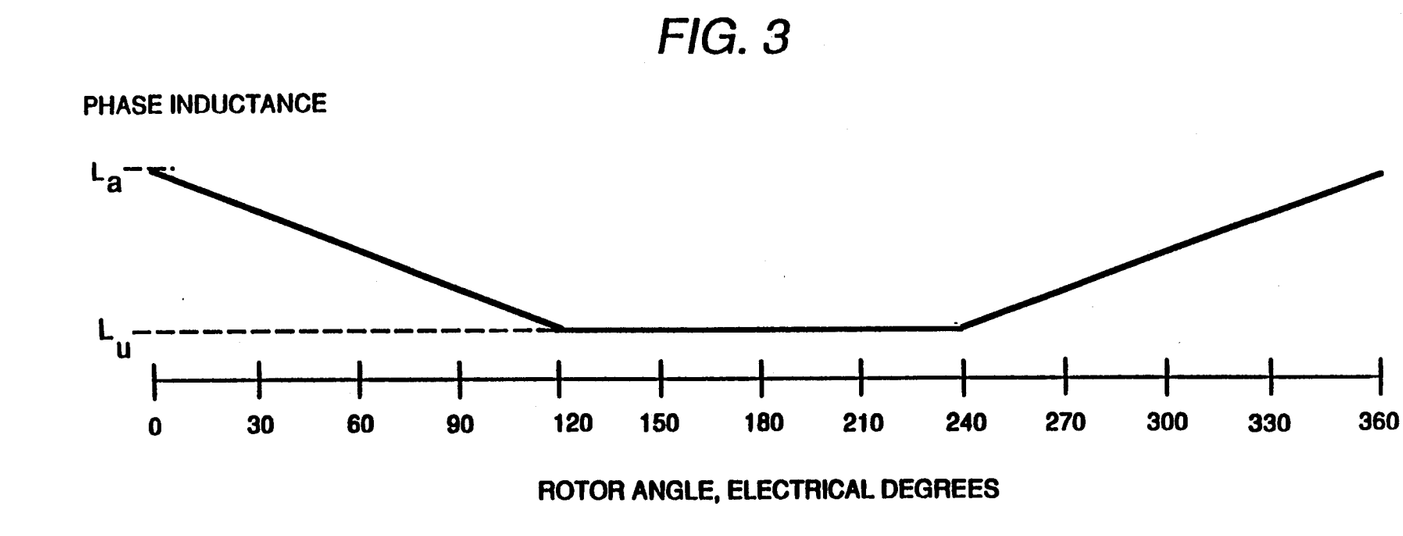
FIG. 3 is a graphical illustration of ideal phase inductance as a function of rotor angle.

Ideal phase inductance (i.e., neglecting saturation and leakage flux) is plotted as a function of rotor angle $\theta$, in electrical degrees, in FIG. 3. (As will be appreciated by those skilled in the art, in a SRM having a three-phase, 6-4 pole configuration, such as that illustrated in FIG. 1, a mechanical degree is one-fourth of an electrical degree. However, since electronic commutation is the concern herein, all positions will be described in terms of electrical degrees.) In particular, phase inductance L is a two-valued function of rotor position $\theta$. That is, a given inductance value occurs once as the rotor poles are moving toward alignment with stator poles of a respective phase, and again as the poles are moving away from alignment. From equation (1), it is apparent that this value of inductance can be determined by corresponding measurements of phase flux $\Psi$ and phase current I. To this end, stator flux linkage $\Psi$ may be measured directly using well-known sensing coils; however, such coils are typically fragile and unreliable. Therefore, under most operating conditions, an accurate determination of phase flux linkage $\Psi$ can be made by employing the relationship between phase flux linkage $\Psi$, phase current I, and phase voltage V according to the following expression:

$$V = Ir + \frac{d\Psi}{dt}, \quad (2)$$

where r is the phase winding resistance. An estimate of the flux linkage $\Psi$ can thus be determined from:

$$\Psi = \int (V - Ir) dt \quad (3)$$

Advantageously, since the flux linkage returns to zero at the end of each electrical cycle in a SRM, an integrator employed to estimate the flux linkage $\Psi$ can be reset to zero at the end of each cycle, thus avoiding an accumulation of errors.

Figure 4:
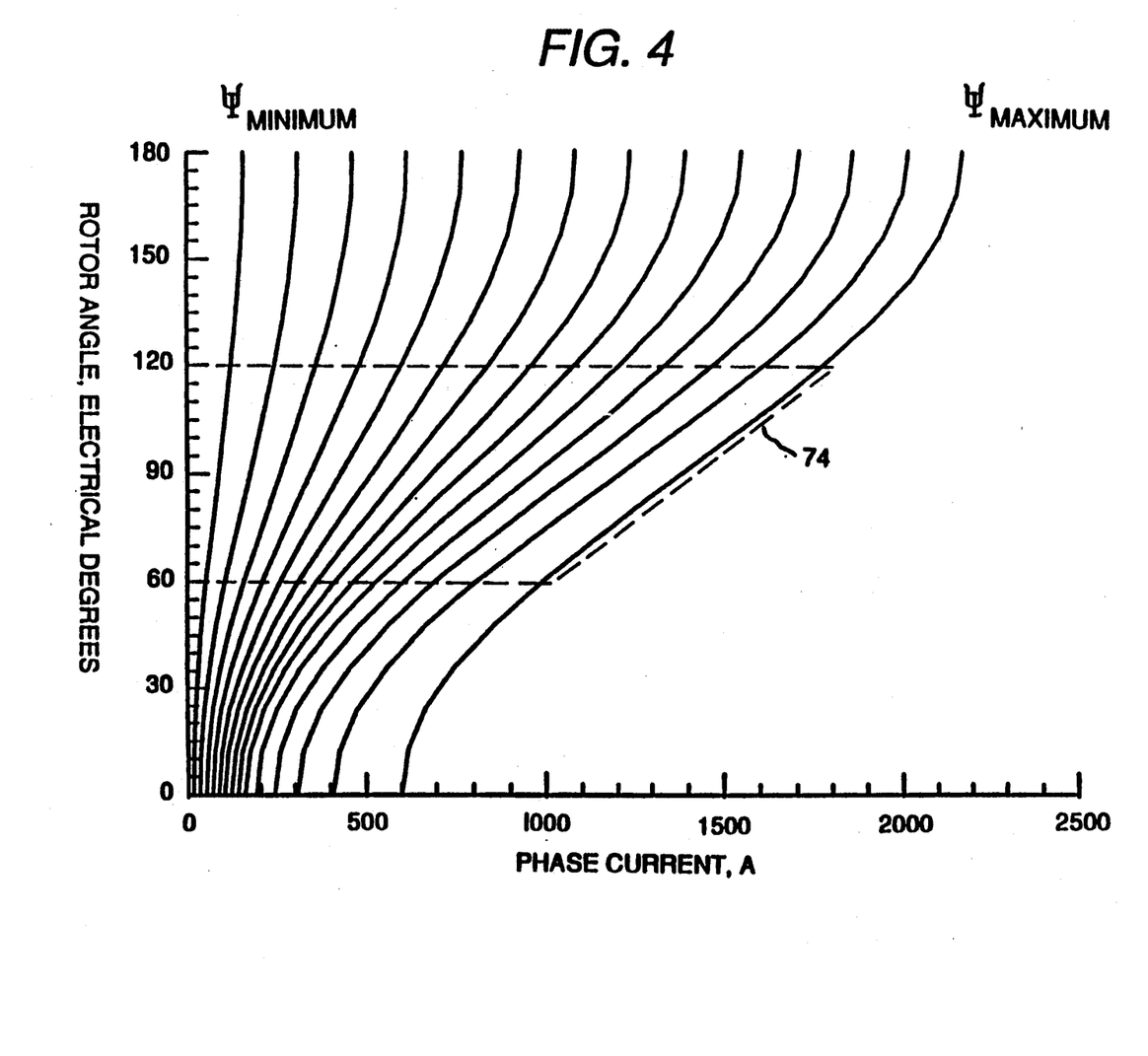
FIG. 4 is a graphical illustration of rotor angle versus phase current for different values of phase flux.

FIG. 4 illustrates rotor angle $\theta$ versus phase current I as a function of flux linkage $\Psi$, wherein $\theta = 0$ represents unalignment. From FIG. 4, it is apparent that for relatively small values of $\theta$, i.e. near maximum unalignment, relatively small errors in current or flux measurements may result in relatively large errors in the rotor angle estimate. Similarly, at rotor angles approaching alignment, relatively small errors in current or flux measurements may result in relatively large errors in the angle estimate. Therefore, as described in the hereinabove cited patent application of Lyons and MacMinn, Ser. No. 07/653,374, a pair of optimal sensing regions is defined for each phase. The boundaries of each sensing region depends on the magnetization characteristics of the particular SRM being employed. For the SRM having the characteristics illustrated in FIG. 4, for example, suitable sensing regions are defined by the dashed lines 74. Specifically, for the SRM represented by the curves of FIG. 4, the valid sensing regions range from 120° before alignment to 60° before alignment, and from 60° after alignment to 120° after alignment. In the sensing region, the $\Psi$-I curves are separated sufficiently and have easily measurable slopes, so that error sensitivity is minimized.

Figure 5:
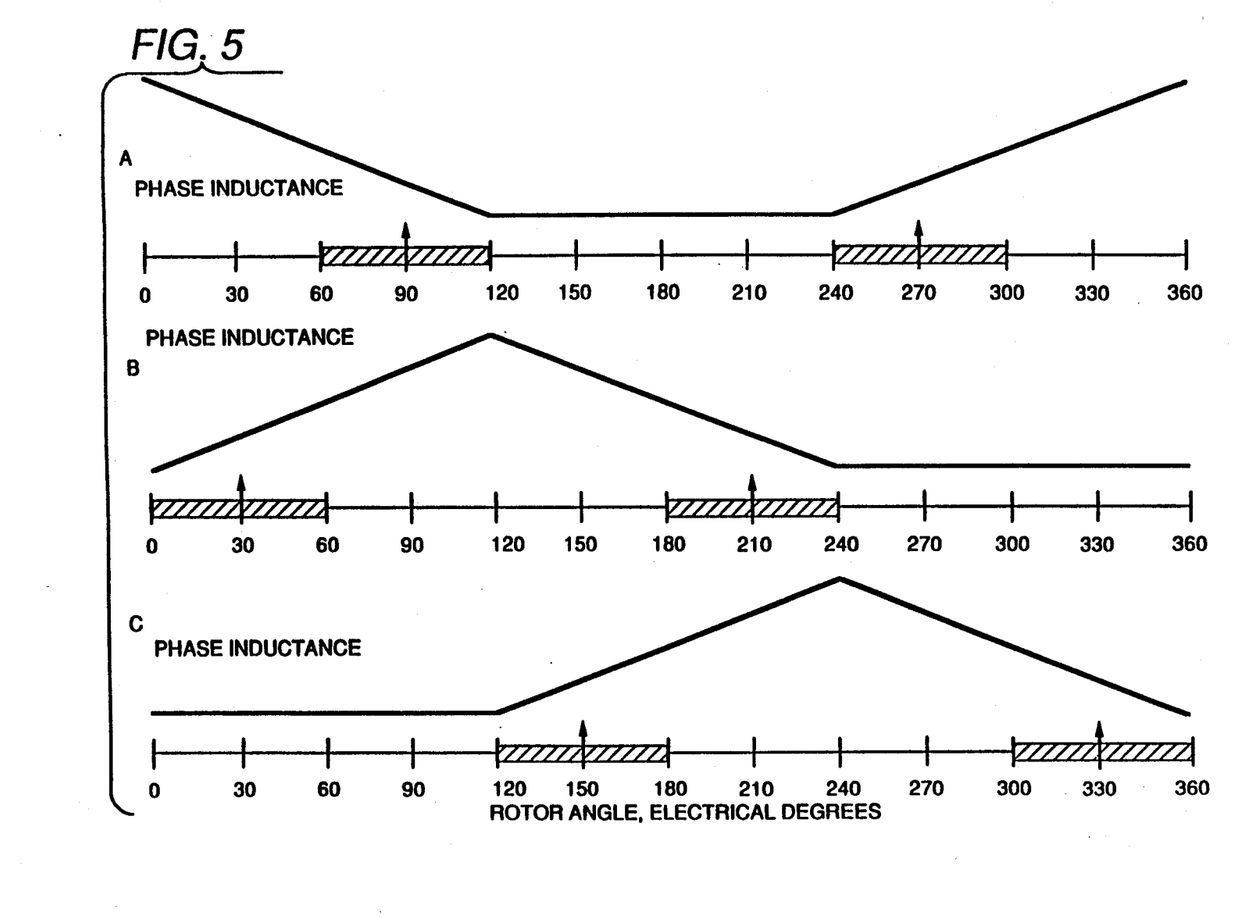
FIG. 5 is a graphical illustration of phase inductance versus rotor angle which shows the sensing regions for each respective phase for a three-phase SRM.

FIG. 5 graphically illustrates phase inductance L versus rotor angle $\theta$ for each phase A, B and C of a three-phase SRM, such as the one illustrated in FIG. 1. The cross-hatched rectangular regions in each graph correspond to the sensing regions for each respective phase. For the SRM represented by the graphs of FIG. 5, the sensing regions for each phase extend from 60° after alignment to 120° after alignment, and from 120° before alignment to 60° before alignment. (Additionally, optimal sampling instants in each respective sensing region are indicated by arrows for a discrete implementation of the position estimator of the present invention.)

Figure 6:
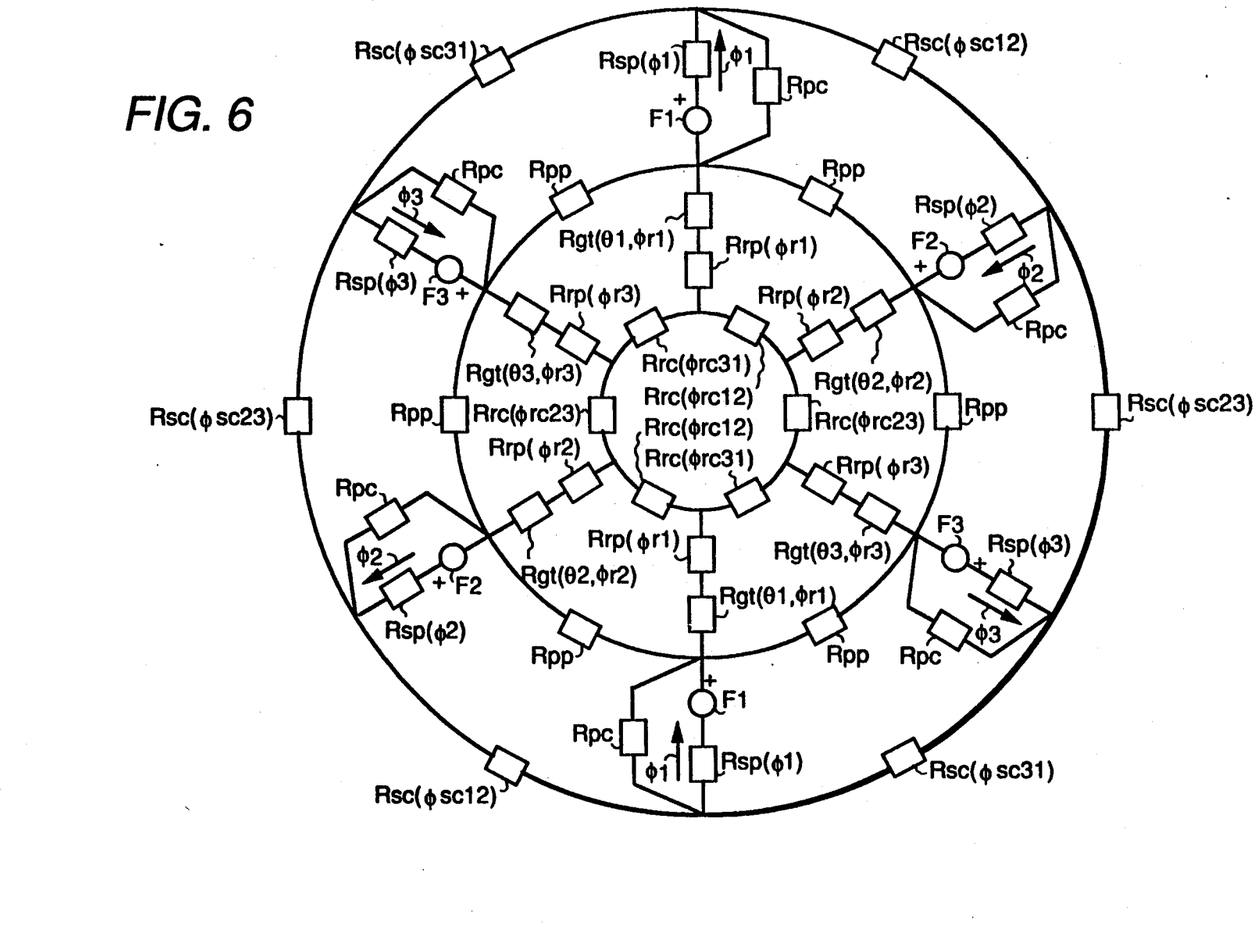
FIG. 6 is a lumped parameter flux/current model useful in determining rotor position in accordance with the method of the present invention.

FIG. 6 shows a lumped parameter flux/current model of a three-phase SRM, such as that of in FIG. 1, which accounts for mutual coupling between the phases thereof in accordance with the present invention. As illustrated, the model comprises a network mesh of stator, rotor, and air gap reluctance terms. Specifically, the reluctance components of the model are defined as follows:

$R_{sc}(\phi)$ stator core reluctance: a saturable component representing the stator core flux path $R_{sp}(\phi)$ stator pole reluctance: a saturable component representing the stator pole base flux path $R_{pc}$ stator pole-to-core reluctance: a non-saturable component representing the stator pole and three-dimensional end leakage flux paths $R_{pp}$ stator pole-to-pole reluctance: a non-saturable component representing the leakage flux path between adjacent stator poles $R_g(\theta)$ air gap reluctance: a non-saturable component representing the stator-to-rotor air gap flux path, a function of the rotor angle $\theta$ relative to alignment $R_t(\theta,\phi)$ pole tip reluctance: a saturable component representing the flux path through both rotor and stator pole tips $R_{gt}(\theta,\phi)$ air gap and pole tip reluctance: the sum of $R_g(\theta)$ and $R_t(\theta,\phi)$ $R_{rp}(\phi)$ rotor pole reluctance: a saturable component representing the rotor pole base flux path $R_{rc}(\phi)$ rotor core reluctance: a saturable component representing the rotor core flux path The saturable components are modeled as a function of the local flux density $\phi$ as follows:

$$R(\phi) = k_1 + k_2 \left| \frac{\phi}{A} \right|^m, \quad (4)$$

where A represents the cross sectional area of the flux path, $k_1$, $k_2$ and m are constants which may be determined from laboratory data or finite element modeling of the particular SRM.

The air gap reluctance $R_g(\theta)$ is a periodic function of the angle $\theta$ relative to alignment and is modeled as follows:

$$R_g(\theta) = \frac{1}{\alpha_1 + \alpha_2 |\cos(\theta/2)|^n}. \quad (5)$$

where $\alpha_1$, $\alpha_2$, and n are constants which may be determined from laboratory data or finite element modeling of the particular SRM.

The pole-tip reluctance model $R_t(\theta,\phi)$ is obtained by varying the cross sectional area term as a function of rotor angle according to:

$$A(\theta) = k_3 + k_4 \|\cos(\theta/2)\|^p, \quad (6)$$

so that $$R_t(\theta,\phi) = k_5 + k_6 \|(\phi, A(\theta))\|^q, \quad (7)$$

where $k_3$–$k_6$, p and q are constants, the values of which may be obtained from laboratory data or finite element analysis of the particular SRM.

The network of FIG. 6 is driven by mmf terms $F_1$, $F_2$ and $F_3$, corresponding to the ampere-turns applied to each of the respective stator poles. The stator pole flux density terms $\phi_1$, $\phi_2$ and $\phi_3$ resulting from this excitation are determined from phase current and phase flux measurements. In accordance with the present invention, the phase current and phase flux measurements are made for each phase simultaneously. Specifically, for each phase i,:

$$\phi_i = \frac{\Psi_i}{N} \quad (8)$$

where $\Psi_i$ is determined from measurements of phase voltage and current as described hereinabove with reference to equation (3), and N represents the number of ampere-turns for each respective phase i.

The stator pole reluctances for each phase $R_{sp}(\phi_i)$ are evaluated as a function of stator pole flux density $\phi_i$. In a preferred embodiment, the stator pole reluctances $R_{sp}(\phi_i)$ are stored as a look-up table in read-only memory (ROM).

Figure 7:
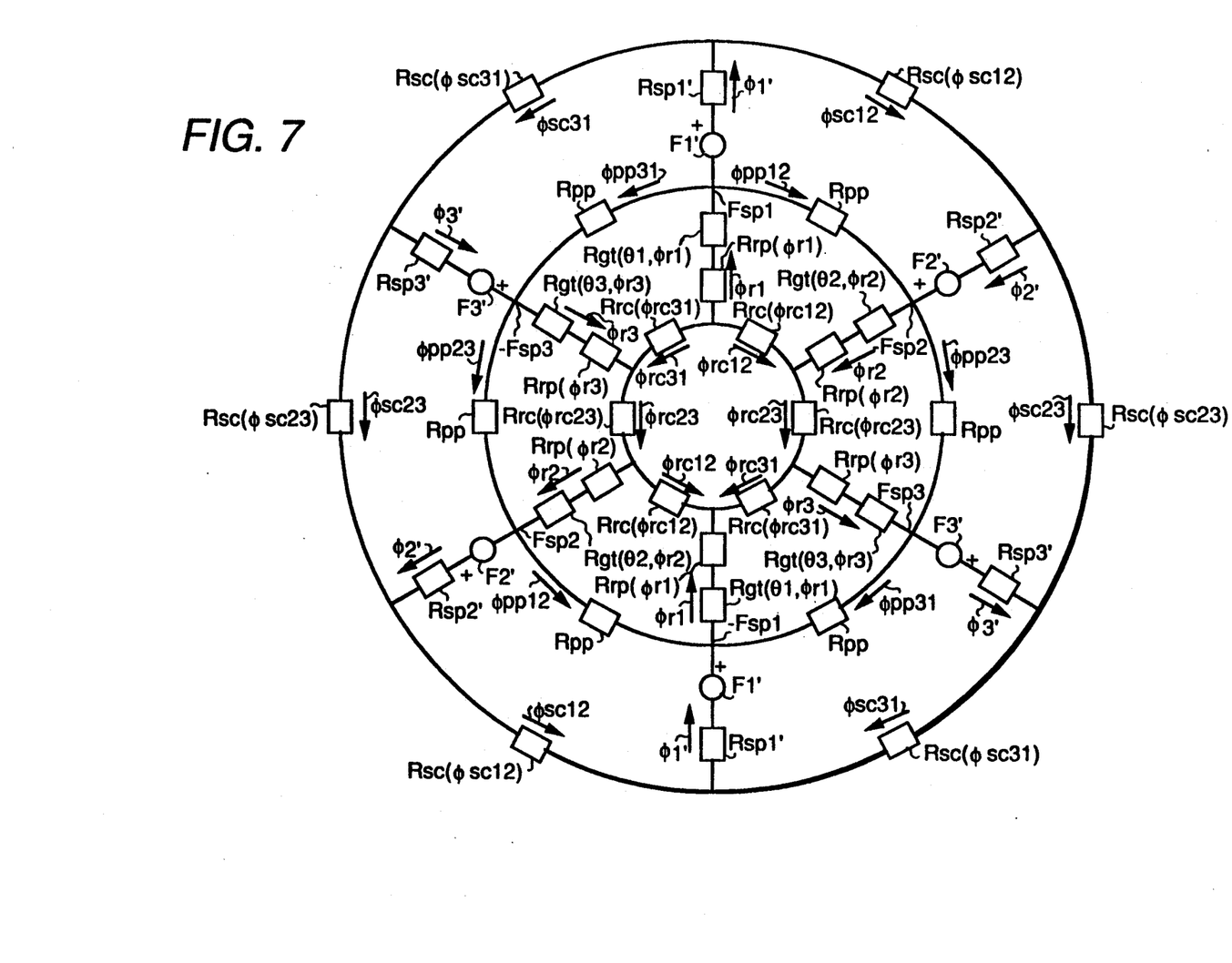
FIG. 7 is the Thevenin equivalent circuit of the model of FIG. 6.

With the values of phase flux density $\phi_i$ and stator pole reluctance $R_{sp}(\phi_i)$ thus determined for each respective phase, the next step in the indirect rotor position sensing method of the present invention involves replacing the stator pole model of FIG. 6 with a Thevenin equivalent circuit, as shown in FIG. 7 and described according to the following equations:

$$F_i' = \frac{R_{pc}}{R_{spi} + R_{cp}} F_i \quad (9)$$

$$R_{spi}' = \frac{R_{pc} R_{spi}}{R_{pc} + R_{spi}} \quad (10)$$

$$\phi_i' = \frac{[R_{pc} - R_{spi}]\phi_i - F_i}{R_{pc}} \quad (11)$$

From the Thevenin equivalent circuit model of FIG. 7, the stator core flux densities $\phi_{sc}$, i.e. between phases i and j, are determined as follows:

$$\phi_{sc12} = \frac{\phi_1' + \phi_2' - \phi_3'}{2} \quad (12)$$

$$\phi_{sc23} = \frac{\phi_1' - \phi_2' - \phi_3'}{2} \quad (13)$$

$$\phi_{sc31} = \frac{\phi_1' - \phi_2' + \phi_3'}{2} \quad (14)$$

Then, the stator core reluctances are evaluated as a function of the stator core fluxes, i.e. $R_{scij} = R_{sc}(\phi_{scij})$. In a preferred embodiment, the stator core reluctances are stored in ROM as a two-dimensional look-up table. With the stator core reluctances thus determined, the stator pole mmf's $F_{spi}$ are determined from loop equations around the stator periphery;

$$F_{sp1} = -F_1' + R_{sp1}\phi_1' + \quad (15)$$

$$\frac{R_{sc12}}{2}\phi_{12} + \frac{R_{sc23}}{2}\phi_{23} + \frac{R_{sc31}}{2}\phi_{31}$$

$$F_{sp2} = -F_2' + R_{sp2}\phi_2' - \quad (16)$$

$$\frac{R_{sc12}}{2}\phi_{12} - \frac{R_{sc23}}{2}\phi_{23} - \frac{R_{sc31}}{2}\phi_{31}$$

$$F_{sp3} = -F_3' + R_{sp3}\phi_3' - \quad (17)$$

$$\frac{R_{sc12}}{2}\phi_{12} - \frac{R_{sc23}}{2}\phi_{23} + \frac{R_{sc31}}{2}\phi_{31}$$

With the stator pole mmf's, the pole-to-pole flux leakage $\phi_{ppij}$ between phases i and j are obtained as follows:

$$\phi_{pp12} = \frac{F_{sp1} + F_{sp2}}{R_{pp}} \quad (18)$$

$$\phi_{pp23} = \frac{F_{sp2} - F_{sp3}}{R_{pp}} \quad (19)$$

$$\phi_{pp31} = \frac{-F_{sp3} + F_{sp1}}{R_{pp}} \quad (20)$$

Then, using the pole-to-pole flux leakages as determined by equations (18)-(20), the rotor flux densities $\phi_{ri}$ are determined from the following equations:

$$\phi_{r1} = \phi'_1 + \phi_{pp12} + \phi_{pp31} \quad (21)$$

$$\phi_{r2} = \phi'_2 - \phi_{pp23} + \phi_{pp12} \quad (22)$$

$$\phi_{r3} = \phi'_3 + \phi_{pp31} - \phi_{pp23} \quad (23)$$

And, from the rotor flux densities $\phi_{ri}$, the rotor core flux densities $\phi_{rcij}$ are determined as follows:

$$\phi_{rc12} = \frac{-\phi_{r1} - \phi_{r2} + \phi_{r3}}{2} \quad (24)$$

$$\phi_{rc23} = \frac{-\phi_{r1} + \phi_{r2} + \phi_{r3}}{2} \quad (25)$$

$$\phi_{rc31} = \frac{-\phi_{r1} + \phi_{r2} - \phi_{r3}}{2} \quad (26)$$

The rotor core reluctances are then evaluated as a function of the rotor Core flux densities, i.e. $R_{rcij} = R_{rc}(\phi_{rcij})$. In a preferred embodiment, the rotor core reluctances are stored in ROM as a two-dimensional look-up table. In addition, the rotor pole reluctances are evaluated as a function of the rotor pole fluxes, $R_{rpij} = R_{rp}(\phi_{rcij})$, which are also stored in ROM as a look-up table in a preferred embodiment.

Next, by using the following mmf loop equations for each phase's rotor flux path, the gap-tip reluctance term $R_{gti}$ for each respective phase i can be determined:

$$R_{gt1} = R_{gt}(\theta_1, \phi_{r1}) \quad (27)$$
$$= \frac{-2F_{sp1} + R_{rc12}\phi_{rc12} + R_{rc23}\phi_{rc23} + R_{rc31}\phi_{rc31}}{2\phi_{r1}} - R_{rp1}$$

$$R_{gt2} = R_{gt}(\theta_2, \phi_{r2}) \quad (28)$$
$$= \frac{-2F_{sp2} + R_{rc12}\phi_{rc12} - R_{rc23}\phi_{rc23} - R_{rc31}\phi_{rc31}}{2\phi_{r2}} - R_{rp2}$$

$$R_{gt3} = R_{gt}(\theta_3, \phi_{r3}) \quad (29)$$
$$= \frac{-2F_{sp3} + R_{rc12}\phi_{rc12} - R_{rc23}\phi_{rc23} + R_{rc31}\phi_{rc31}}{2\phi_{r3}} - R_{rp3}$$

Figure 8:
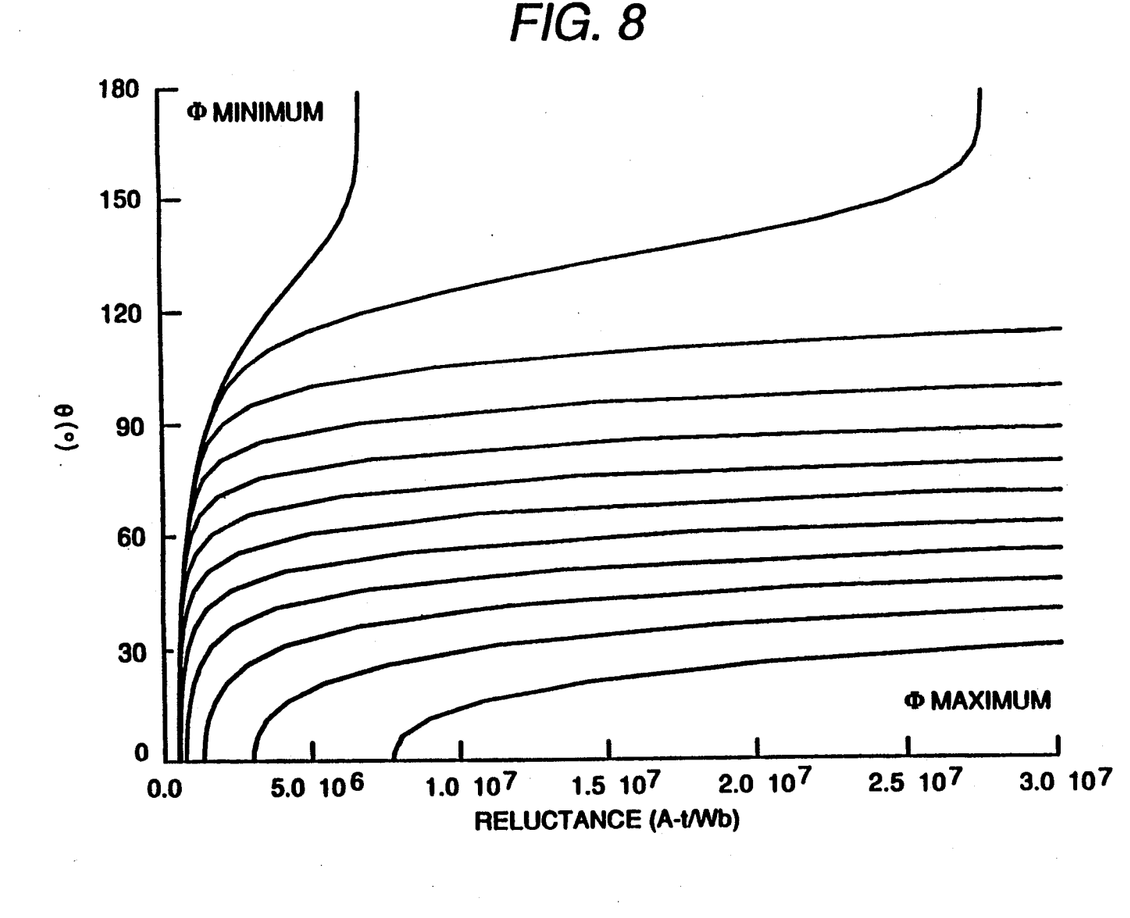
FIG. 8 is a graphical illustration of rotor angle versus alignment for different values of flux.

With the gap-tip reluctance values as determined hereinabove, the rotor angle relative to alignment for each respective phase i is determined from the inverse reluctance function $\theta_i = f(\phi_{ri}, R_{gti})$, illustrated graphically in FIG. 8. Specifically, FIG. 8 is a graph of rotor angle $\theta$ versus reluctance for different values of flux density $\phi$. In a preferred embodiment, this graph is stored as a two-dimensional look-up table.

Referring now to FIG. 5, with the rotor angle relative to alignment for each respective phase known, the sensing phase can be determined. That is, the sensing phase is the phase operating in one of its predetermined sensing regions. The rotor angles of at least one of the remaining phases are then used to determine whether rotor poles of the SRM are approaching alignment or maximum unalignment with the stator poles of the sensing phase. In particular, the rotor angles of two phases are needed to determine the direction of rotation of the motor, since inductance is a two-valued function of rotor angle, as described hereinabove. Finally, a rotor position estimate $\theta_r$ for the SRM is determined from:

$$\theta_r = \frac{2\pi}{3}(i - 1) \pm \theta_i \quad (30)$$

where i designates the sensing phase, and the sign of $\theta_i$ depends on the direction of rotation and whether or not the rotor poles are approaching alignment with the stator poles of the sensing phase.

Figure 9:
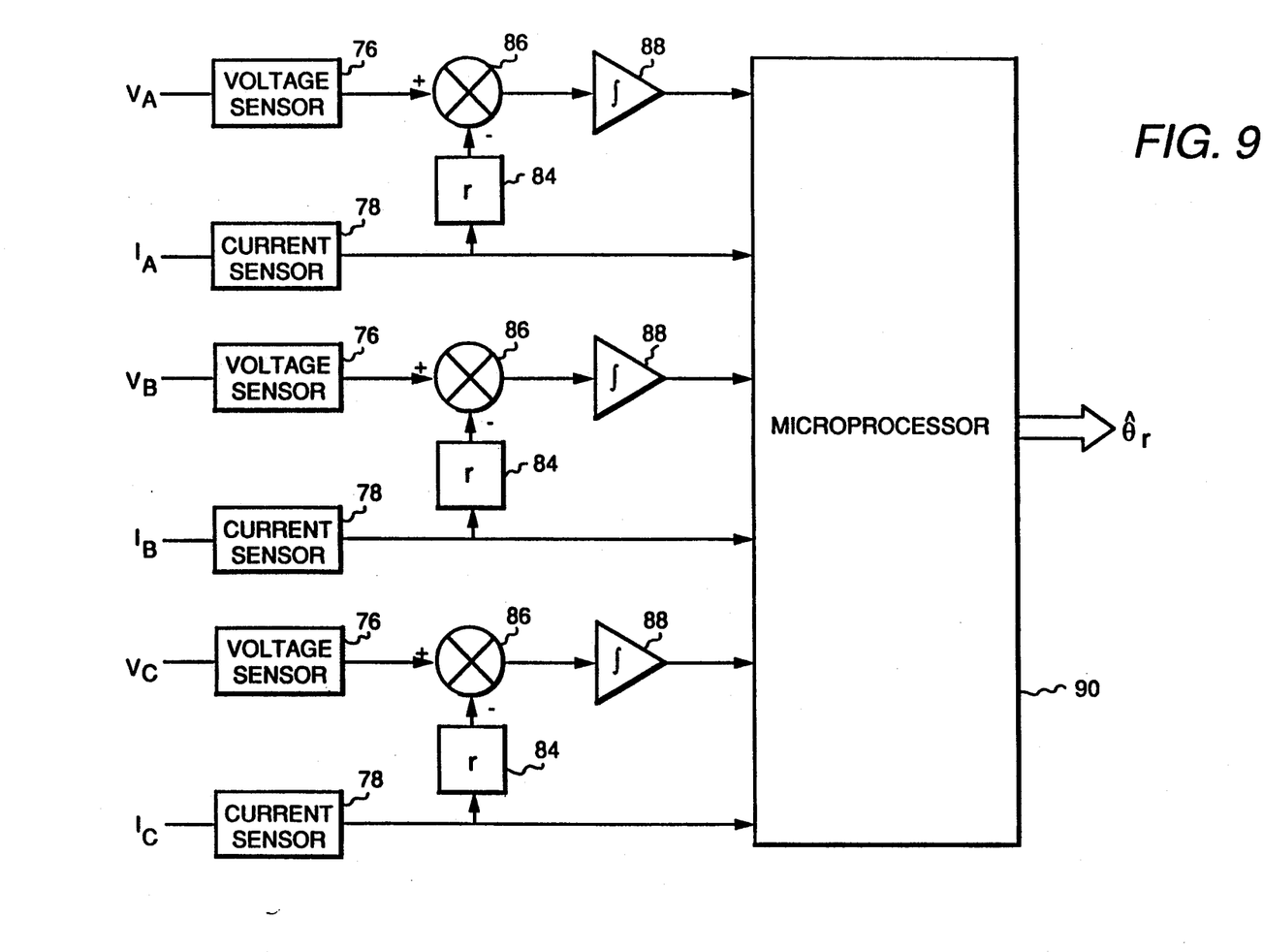
FIG. 9 illustrates a preferred implementation of a rotor position estimator in accordance with the present invention.

FIG. 9 illustrates a preferred embodiment of a rotor position estimator in accordance with the present invention. The phase current for each respective phase $I_A$, $I_B$ and $I_C$ is sensed by a suitable current sensor 76 (e.g., a Hall-effect sensor, sensing transformer, or sensing resistor) and the phase winding voltage $V_A$, $V_B$ and $V_C$ is sensed by a suitable voltage sensor or is otherwise determined by a suitable indirect method for estimating voltage. Each respective phase current is provided to a multiplier 84 wherein it is multiplied by the phase winding resistance r, and the result is subtracted from the phase winding voltage V by a summer 86. The output signal from summer 86 is integrated by an integrator 88 to provide an estimate of the phase flux $\Psi$. The phase flux and phase current signals for each phase are provided to a microprocessor 90 which includes look-up tables for the following components of the flux/current model of FIG. 6: stator pole reluctances $R_{sp}(\phi_i)$, stator core reluctances $R_{sc}(\phi_i)$, rotor core reluctances $R_{rc}(\phi_{rcij})$, rotor pole reluctances $R_{rp}(\phi_{rcij})$, and the inverse reluctance function $\theta_i = f(\phi_{ri}, R_{gti})$ (FIG. 8). In addition, microprocessor 90 is employed to make the calculations of equations (9)-(30) based on the phase current and flux measurements and the flux/current model in accordance with the rotor position estimation method of the present invention.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for estimating rotor position of a switched reluctance motor including a stator having a plurality of pairs of opposing stator poles and a rotor having a plurality of rotor poles, each respective phase of said motor comprising at least one of said pairs of opposing stator poles and a phase winding wound thereon, said method comprising the steps of:
    (a) simultaneously sensing phase current in each respective phase of said switched reluctance motor;
    (b) simultaneously sensing phase flux in each respective phase of said switched reluctance motor;
    (c) determining the reluctance of the stator-to-rotor air gap flux path of each respective phase of said motor, including that of the flux through the stator and rotor pole tips, by using the phase current and phase flux measurements for each respective phase of said motor;

(d) evaluating rotor position angle as a function of reluctance and phase flux for each respective phase of said motor;

(e) determining which phase of said motor is operating in a predetermined sensing region corresponding to a predetermined range of rotor angles, said phase being designated as the sensing phase;

(f) determining whether rotor poles of said motor are approaching alignment with the stator poles of said sensing phase by using the phase current and phase flux measurements from the other phases of said motor;

whereby the rotor angle of said sensing phase and its position relative to alignment uniquely determine the rotor position of said motor.

2. The method of claim 1 wherein the step of sensing phase flux comprises sensing the voltage V across the respective phase winding and computing the phase flux $\Psi$ according to the expression:

$$\Psi = \int (V - Ir) dt,$$

where r is the phase winding resistance, and I is the phase current.

3. The method of claim 1 wherein steps (c) through (f) are performed in a microprocessor.

4. The method of claim 1 wherein each respective sensing region comprises a pair of discrete sampling instants.

5. A rotor position estimator for a switched reluctance motor including a stator having a plurality of pairs of opposing stator poles and a rotor having a plurality of rotor poles, each respective phase of said motor comprising at least one of said pairs of opposing stator poles and a phase winding wound thereon, said rotor position estimator comprising:

current sensing means for sensing phase current in each respective phase of said switched reluctance motor;

flux sensing means for sensing phase flux in each respective phase of said switched reluctance motor;

flux/current model means for determining the reluctance of the stator-to-rotor air gap flux path of each respective phase of said motor, including that of the flux through the stator and rotor pole tips, by using the phase current and phase flux measurements for each respective phase of said motor;

look-up table means for evaluating rotor position angle as a function of reluctance and phase flux for each respective phase of said motor;

sensing phase means for determining which phase of said motor is operating in a predetermined sensing region corresponding to a predetermined range of rotor angles, said phase being designated as the sensing phase; and direction means for determining whether rotor poles of said motor are approaching alignment with the stator poles of said sensing phase by using the phase current and phase flux measurements from the other phases of said motor;

computing means for providing a rotor position estimate based on the rotor angle of said sensing phase and its position relative to alignment.

6. The rotor position estimator of claim 5 wherein said flux sensing means comprises:

voltage sensing means for sensing the voltage V across the respective phase winding; and integrator means for providing an estimate of the phase flux $\Psi$ according to the expression:

$$\Psi = \int (V - Ir) dt,$$

where r is the phase winding resistance, and I is the phase current.

7. The rotor position estimator of claim 5 wherein said flux/current model means, said look-up table means, said sensing phase means, said direction means and said computing means together comprise a microprocessor.

8. The rotor position estimator of claim 5 wherein each respective sensing region comprises a pair of discrete sampling instants.

* * * * *